June 10, 1924.                    J. C. LUEDKE                    1,497,522
                              PERCOLATOR ATTACHMENT
                                Filed Jan. 8, 1924
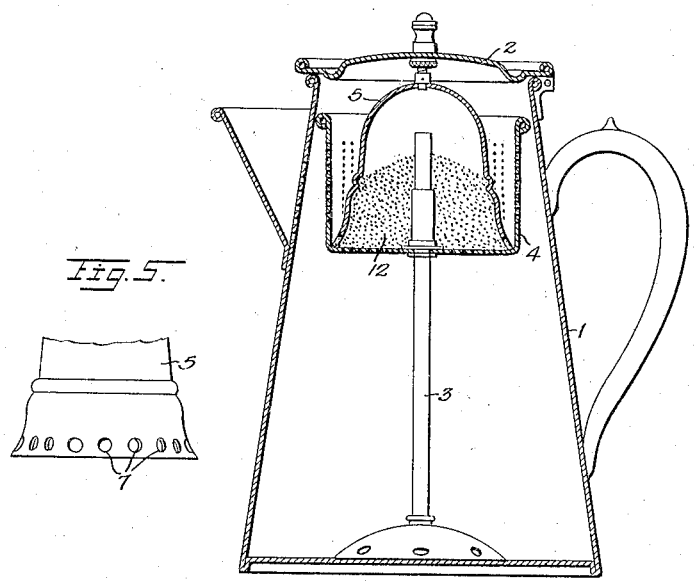
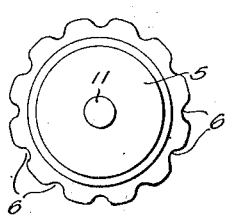
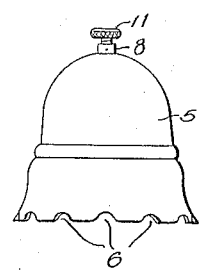
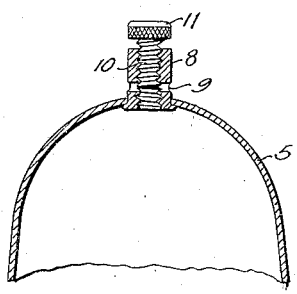
WITNESSES                                                     INVENTOR
                                                              J.C. LUEDKE
                                                          BY
                                                              ATTORNEYS Patented June 10, 1924.

1,497,522

UNITED STATES PATENT OFFICE.

JULIUS C. LUEDKE, OF CEDAR RAPIDS, IOWA.

PERCOLATOR ATTACHMENT.

Application filed January 8, 1924. Serial No. 685,030.

*To all whom it may concern:*

Be it known that I, JULIUS C. LUEDKE, a citizen of the United States, and a resident of Cedar Rapids, in the county of Linn and State of Iowa, have invented a new and Improved Percolator Attachment, of which the following is a full, clear, and exact description.

This invention relates to improvements in percolator attachments and more particularly to an improved cup which is adapted to be positioned in the coffee receptacle in an inverted position so as hold and trap the coffee grounds and also enclose the upper discharge end of the percolator tube so that the water and steam are utilized the maximum degree for thorough percolation.

An object of the invention is to provide an attachment or cup of this kind which may be desired to fit any ordinary percolator and which will result in an economy of coffee consumed and which permits the coffee to be made as strong or as weak as may be desired to suit the taste of the user.

With these and other objects in view, the invention consists in certain novel features of construction and combinations and arrangements of parts which will be more fully hereinafter described and pointed out in the claims.

In the accompanying drawings—

Figure 1 is a view in longitudinal section illustrating my improved cup in position in a percolator;

Figure 2 is a top plan view of the cup;

Figure 3 is a view in side elevation of the cup;

Figure 4 is a view in vertical section through the upper portion of the cup, showing the vent and its controlling plug;

Figure 5 is a fragmentary view in side elevation illustrating a modified form of cup.

1 represents a coffee pot of ordinary construction having a hinged cover 2 and provided with a vertically positioned percolator 3 supporting a perforated coffee receptacle 4 at its upper end. 5 represents my improved cup or attachment, which may be used in connection with the particular type of coffee pot shown or may be used with various other types of coffee pot either in its identical form or with slight modifications in size and shape, as will be readily understood.

The cup 5 is of general bell shape, the flared lower end having notches 6 therein, or, instead of the notches 6, openings or perforations 7 may be provided adjacent the lower edge of the cup, as shown in the modification in Figure 5. This cup 5 may be composed of aluminum or of any other suitable metal or material adapted for the purpose. At the top or upper end of the cup 5 a short internal screw-threaded sleeve 8 is rigidly secured and provided with one or more transverse openings 9 above the cup, constituting outlets or vents to permit steam or the water to escape in such proportion as may be permitted by a screw-threaded plug 10 located in the sleeve 8 and having a head 11 at its upper end. It will be noted that by adjusting this plug 10 the outlets 9 may be opened, partially opened or nearly closed at the desire of the operator. Furthermore, this plug 10 serves to engage the cover 2 and prevent the cup from being forced upwardly by the pressure within.

In operation the cup is inserted over the coffee grounds, as indicated by the reference numeral 12 so as to trap the same and receive the upper end of the percolator tube 3, as clearly shown in Figure 1. The steam and water bubbling upward from the tube 3 passes downwardly through the coffee grounds 12 and escapes at the lower edge of the cup 5 and through the receptacle 6 back into the coffee pot. When the plug 10 is screwed down to its lowest position the entire quantity of steam and water is utilized and the coffee grounds being confined or trapped within the cup insures a complete utilization of the entire content of the coffee grounds so that an economy in the use of the coffee is had. The coffee may be as strong as desired or as weak as desired, and if the operator desires to weaken the resultant coffee he merely adjusts the plug 10 to allow a portion of the steam or water to escape through the outlets or vents 9.

Various slight changes and alterations might be made in the general form of the parts described without departing from my invention, and, hence, I do not limit myself to the precise details set forth but consider myself at liberty to make such slight changes and alterations as fairly fall within the spirit and scope of the appended claims.

I claim:

1. An attachment for percolators, comprising a cup adapted to be inserted in inverted position within a coffee receptacle and supported on the bottom thereof and confine the coffee grounds therein.

2. An attachment for percolators, comprising a cup adapted to be inserted in inverted position within a coffee receptacle and supported on the bottom thereof and confine the coffee grounds therein, said cup having outlets at its lower edge.

3. An attachment for percolators, comprising a cup adapted to be inserted in inverted position within a coffee receptacle and confine the coffee grounds therein, an outlet at the top of the cup, and an adjustable plug controlling said outlet.

4. An attachment for percolators, comprising a cup adapted to be inserted in inverted position within a coffee receptacle and confine the coffee grounds therein, a sleeve fixed in the upper end of the cup and having a screw-threaded bore and a radial outlet communicating therewith, and a screw-threaded plug in said bore and controlling the outlet.

JULIUS C. LUEDKE.